United States Patent [19]

Duthie et al.

[11] Patent Number: 4,575,192
[45] Date of Patent: Mar. 11, 1986

[54] METHOD OF BRAGG ANGLE ADJUSTMENTS FOR COPYING HOLOGRAMS

[75] Inventors: Joseph G. M. Duthie, Huntsville; Charles R. Christensen, Athens, both of Ala.; Carl D. Leonard, Ann Arbor, Mich.

[73] Assignee: The United States of America as represented by the Secretary of the Army, Washington, D.C.

[21] Appl. No.: 540,949

[22] Filed: Oct. 11, 1983

[51] Int. Cl.⁴ .............................................. G03H 1/20
[52] U.S. Cl. .................................................... 350/3.69
[58] Field of Search ........................... 350/3.69; 355/2

[56] References Cited

U.S. PATENT DOCUMENTS 3,639,031  2/1972  Lin ..................................... 350/3.69

OTHER PUBLICATIONS

Caulfield, H. J., *Handbook of Optical Holography*, Academic Press, N.Y., 1979, pp. 377–378.
Collier, R. J. et al., *Optical Holography*, Academic Press, 1971, pp. 228–264.
C. D. Leonard et al., "A Cook Book for Dichromated Gelatin Holograms" Technical Report T-79-17, U.S. Army Missile Research and Development Command, Jan. 1979.
B. J. Chang et al., "Dichromated Gelatin for the Fabrication of Holographic Optical Elements," Applied Optics, vol. 18, No. 14, Jul. 15, 1979, pp. 2407–2417.

*Primary Examiner*—Bruce Y. Arnold
*Attorney, Agent, or Firm*—Anthony T. Lane; Robert P. Gibson; Freddie M. Bush

[57] ABSTRACT

A method of copying a thick hologram, recorded at wavelength $\lambda_1$, so that the copy can be efficiently read out with a beam $\lambda_3$ at the same incident angle as used to efficiently read out the original. The method involves copying the hologram using wavelength $\lambda_2$ at a predetermined incident angle, which incident angle provides fringe angles in the copy to yield maximum diffraction efficiency of the read-out beam $\lambda_3$.

1 Claim, 5 Drawing Figures

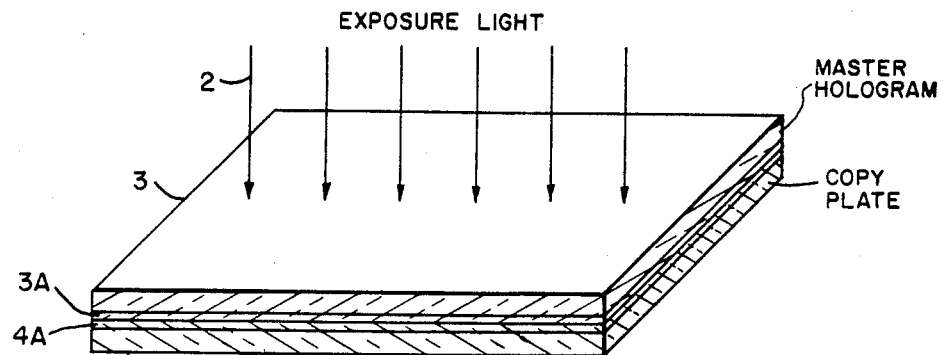
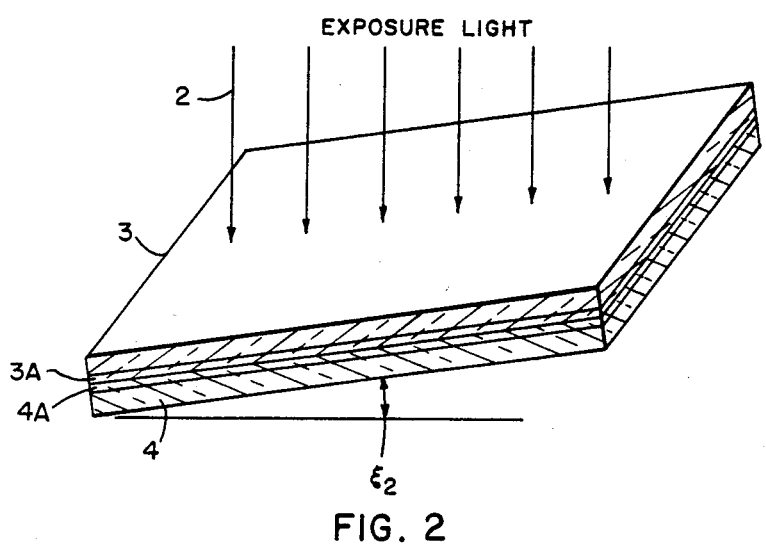
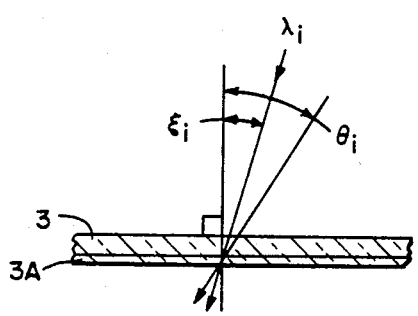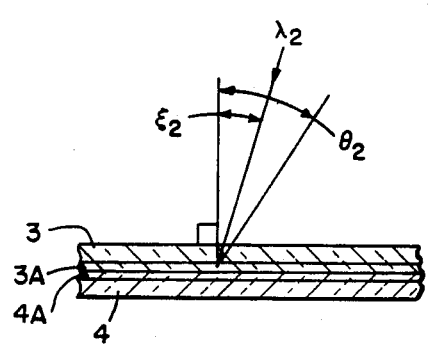

METHOD OF BRAGG ANGLE ADJUSTMENTS FOR COPYING HOLOGRAMS

DEDICATORY CLAUSE

The invention described herein may be manufactured, used, and licensed by or for the Government for governmental purposes without the payment to us of any royalties thereon.

BACKGROUND OF THE INVENTION

The established art of copying holograms by contact printing into dichromated gelatin requires mounting the master hologram directly onto the new plate and exposing the combination to spatially coherent actinic light. The exposure is made with the incident, exposing light falling onto the old hologram. The incident light is partially transmitted and partially diffracted to reconstruct the incident and reference wavefronts used in the original manufacture of the hologram. These two wavefronts propagate into the new plate to produce the latent image of the copied hologram. The new plate is then processed to produce a copy of the original hologram. Incident light must be spectrally of narrow bandwidth and spatially coherent to generate and reproduce the correct interference pattern in the copy plate. As shown in FIG. 1, the exposure light 2 passes through to the surface of the glass plate master 3 containing the original hologram on the lower surface 3A thereof. Surface 3A functions as a diffraction medium for impinging light. This results in a diffracted wave entering the copy plate 4 placed beneath plate 3. Copy plate 4 has a dichromated gelatin surface 4A adjacent the surface 3A. The wave entering the copy plate 4 has two principal components—a straight through beam and a diffracted beam. When the copy plate is finished, the hologram may be read out at the original master recording wavelength.

More detailed discussion on holography and copying holograms is available in the literature. An excellent reference book is "Optical Holography" by R. J. Collier, C. B. Burckhardt, and L. H. Lin, Academic Press, 1971, pages 228–264 in particular.

SUMMARY OF THE INVENTION

In the process of copying a holographic optical element, the master is illuminated at some incidence angle. The incident light, on striking the master, results in two waves, the transmitted wave in the direction of incidence, and the other, a diffracted beam. These two beams then interfere in the material on which the copy is made. By adjusting the angle of incidence of the copying light to a predetermined acute angle away from the normal, the interference pattern in the copy can be modified. This method of copying requires control of the angle at which these interference fringes are produced. The planes of these fringe patterns are adjusted to satisfy the Bragg condition for diffraction by a volume hologram thereby increasing the efficiency of the holographic optical element. Thus a method of fabricating copies of holographic optical elements in a way that optimizes their performance at a specific wavelength is accomplished. This enhancement is achieved in the copying process by contact printing in coherent light incident on the master plate at an orientation which ensures that interference planes in the copy medium are produced at the correct angle to give reflection and diffraction at the desired wavelength into a common direction.

BRIEF DESCRIPTION OF THE DRAWINGS

FIG. 1 is a typical drawing of the prior art method of copying a master hologram on a recording copy plate.

FIG. 2 is a diagram of a preferred embodiment of the hologram copying method at a selectable incident angle of copying light.

FIG. 3 is a geometric schematic for indicating the angles of incidence and diffraction in the copying method.

FIG. 4 is a geometric schematic showing the hologram master and copy plate having grating spacings of d.

DESCRIPTION OF THE PREFERRED EMBODIMENT

Figure 5:
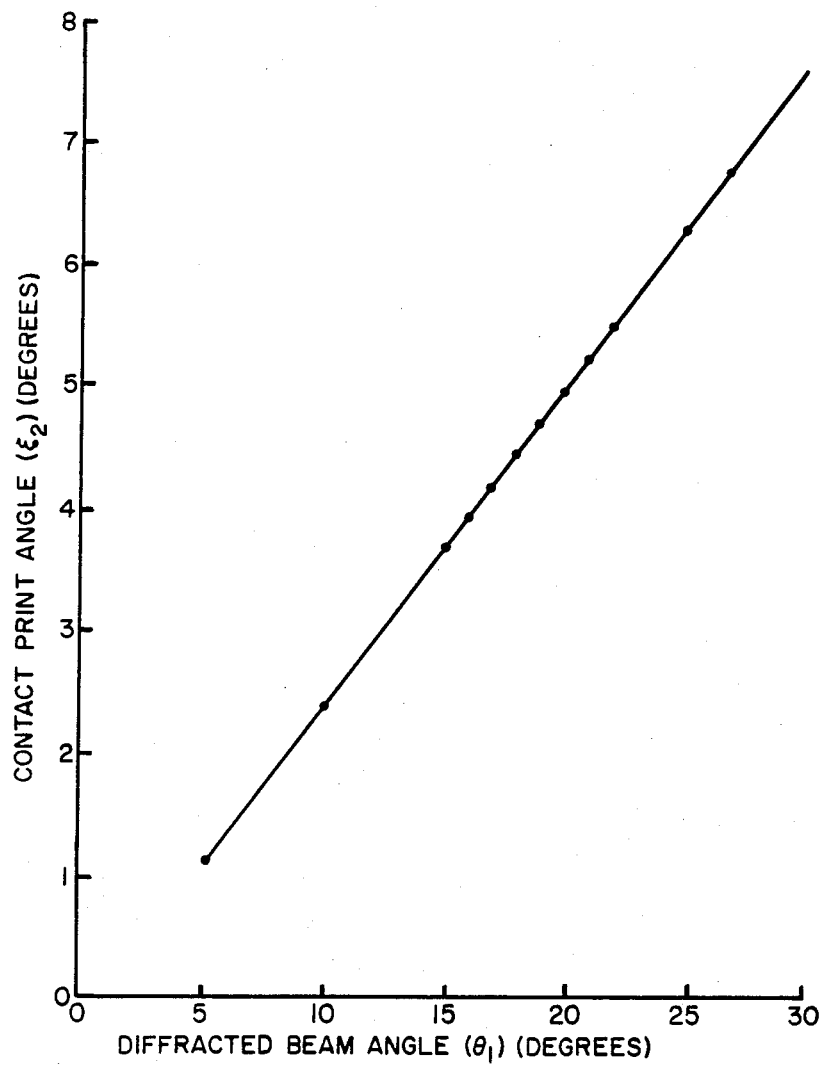
FIG. 5 is a graph showing copying angles for Bragg condition thick holograms in dichromated gelatin as a function of master hologram diffraction angle at predetermined wavelengths.

Referring now to the drawings wherein like numbers represent like parts in each figure. FIG. 1 shows a typical prior art method of copying a hologram as noted in the Background. FIG. 2 shows a similar arrangement of the master plate 3 and copy plate 4 with their respective hologram 3A and dichromated gelatin surface 4A disposed adjacent one another for copying the hologram onto surface 4A. In the improved system the exposure light 2 has wavelength $\lambda_2$ and is at a predetermined acute angle of incidence $\xi_2$ that is given by the solution to two simultaneous equations. Thus the nature of the waves produced from the finished copy plate 4 is provided by selecting the correct angle of incidence for the copying light to alter the nature of the interference pattern in the copy plate in such a way as to optimize the diffraction efficiency of the copy hologram for incident waves at a desired wavelength $\lambda_3$.

In recording a hologram on the copy plate, the fringes are recorded in the dichromated gelatin at the angle that satisfies the Bragg condition for diffraction at $\lambda_3$ in a volume hologram thereby improving the hologram diffraction efficiency. The Bragg condition occurs when the sine of the angle between the hologram interference planes and the readout light incident on them is equal to the readout wavelength divided by twice the plane spacing and is an optimum situation. An example of optimizing a copy plate for readout at a specific wavelength is the preparation of holographic matched filters to be used in an optical correlator which employs radiation at the wavelength $\lambda_3 = 820$ nanometers from a laser diode. Photographic manufacture of the filters is excluded at 820 nanometers since photographic plates and film are not sufficiently sensitive at this wavelength. Since the filters cannot be directly made at $\lambda_3$ it is convenient to routinely manufacture a master containing the original hologram using a helium-neon laser and then copy the master. At the copying stage the energy density required by the dichromated process necessitates the use of an Argon ion laser. Thus three laser wavelengths are involved—$\lambda_1 = 632$ nanometers from the helium-neon laser for writing the master, $\lambda_2 = 514$ nanometers for copying from the master onto the dichromated gelatin using coherent light of an Argon ion laser, and $\lambda_3 = 820$ nanometers for reading out the resultant matched filter developed on plate 4A.

As shown in FIGS. 3 and 4 for each wavelength, $\lambda_i$, there are three pertinent angles $\xi_i$, $\theta_i$, and $\phi_i$ where $i = 1, 2, 3$ for the respective wavelengths of writing the master, copying the master, and reading the copy. $\xi_i$ is the incident beam angle at some acute angle away from the normal to the plate master or copy. $\theta_i$ is the diffracted beam angle, and $\phi_i$ (not shown) is the fringe plane angle.

To simplify the discussion it is assumed that the original or master is already constructed by established prior art procedures with $\xi_1 = 0$ so that the angle of incidence onto the master is normal to the surface. It is further assumed that the final readout from the copy plate is also made with $\xi_3 = 0$ (not shown). Thus the explanation is simplified by setting $\xi_1 = \xi_3 = 0$.

The effect of the index of refraction of the hologram medium and the glass support will not be considered herein, so as to simplify the discussion. While even more accurate results will occur when the index of refraction is considered, it is not necessary for an understanding of how the copying method works.

As shown in FIG. 4, in the copying process the Argon ion laser provides an incident beam $\lambda_2$ at the angle $\xi_2$ from the normal to the master. This beam sees a grating (3A) with grating spacing or grating constant $d = \lambda_1/\sin\theta_1$, which is on the photographic master plate. This results in a diffracted wave entering the dichromated gelatin 4A of the copy plate 4 with two principal components—a straight through beam at the angle $\xi_2$ and a diffracted beam at angle $\theta_2$ where $$\sin\theta_2 = \lambda_2/d + \sin\xi_2. \tag{1}$$

These waves interfere in the body of dichromated gelatin to give fringes oriented at an angle $\phi_2$ (not shown), where $$\phi_2 = \tfrac{1}{2}(\theta_2 + \xi_2). \tag{2}$$

The readout beam at $\lambda_3$, will then be diffracted to $\theta_3$ where $$\sin\theta_3 = \lambda_3/d. \tag{3}$$

The desired result that $\phi_3$ be approximately equal to $\phi_2$ is at the Bragg condition where $$\theta_3 = 2\phi_3 = \theta_2 + \xi_2 \tag{4}$$

Thus, substituting equation (4) into equation (3) results in $$\sin(\theta_2 + \xi_2) = \xi_3/d. \tag{5}$$

Thus in this improved method of copying, the copying light is incident on the master, not at normal incidence but at an angle given by the solution to two simultaneous equations, equations (1) and (5) where $\xi_2$ is the incident angle of the copying light,
$\theta_2$ is the direction of the diffracted beam relative to the normal to the holographic plates,
$\lambda_2$ is the wavelength of the copying light,
$\lambda_3$ is the wavelength of the light in which the hologram is to be read out, and
$d$ is the interference fringe or grating spacing constant ($\lambda_1/\sin\theta_1$) which is known from the wavelength and the angle between the beams used in recording the original or master hologram.

In the equations, the unknowns are $\theta_2$ and $\xi_2$. One way to solve the simultaneous equations (1) and (5) is to tabulate $\theta_2$ as a function of $\xi_2$ as desired from equation (1). Then interpolate graphically the left side of equation (5) plotted as a function of $\xi_2$ to find the value of $\xi_2$ which satisfies equation (5). This value is then denoted as $\xi_0$. The process can be repeated for varying values of $\theta_1$ thereby providing values for several gratings constants (d). This information can be obtained manually or by using a simple computer program. The results of several values of $\theta_1$ and $\xi_2$ are tabulated in Table 1 hereinbelow and shown in the graph of FIG. 5 to be a linear function. The three wavelengths used in this example are $\lambda_1 = 632$ nm, $\lambda_2 = 514$ nm, and $\lambda_3 = 820$ nm.

| TABLE OF RESULTS | |
| --- | --- |
| $\phi_1$ (degrees) | $\xi_2$ (degrees) |
| 5 | 1.7 |
| 10 | 2.4 |
| 15 | 3.7 |
| 16 | 3.92 |
| 17 | 4.15 |
| 18 | 4.45 |
| 19 | 4.7 |
| 20 | 4.95 |
| 21 | 5.2 |
| 22 | 5.5 |
| 25 | 6.25 |
| 27 | 6.75 |

Thus a suitable adjustment of the copying light or exposure light angle is determined by the simultaneous solution to equations (1) and (5) to provide a finished copy plate which functions as a filter at a wavelength different from the plate master. Simultaneous solutions can be found for various original angles $\theta_1$, the angle between the input wave and the diffracted wave in the master hologram.

The method can also be used in the more general case in which $\xi_1 \neq 0$ or $\xi_3 \neq 0$ and in which the index of refraction is also considered. As in the example above, equations corresponding to equations (1) and (5) are solved for $\xi_2$ that will produce intereference fringes in the copy plate with planes oriented to satisfy the Bragg equation at the readout conditions.

While the invention has been described in connection with a specific method and embodiment thereof, it will be understood that various modifications will suggest themselves to those skilled in the art. Accordingly, the invention is intended to cover such modifications that fall within the scope of the claims appended hereto.

I claim:

1. A method of copying a thick master holographic optical element, which element at wavelength $\lambda_1$ would be read out at at optimal efficiency at incident beam angle $\xi_3 = \xi_1$, so that a copy hologram can be read out at optimal efficiency at incident angle $\xi_3 = \xi_1$ but at wavelength $\lambda_3$, said method comprising the steps of:

(a) placing said thick master holographic optical element adjacent a copy plate having a thick emulsion thereon;

(b) directing radiation at wavelength $\lambda_2$ and at predetermined incident angle $\xi_2$ onto said thick master holographic element and adjacent copy plate;

(c) developing the copy plate emulsion to form the copy hologram;

(d) illuminating the copy hologram with radiation at wavelength $\lambda_3$ and at the incident angle $\xi_3 = \xi_1$;

wherein the predetermined incident angle $\xi_2$ is determined so that the resulting fringe plane angles in the copy hologram satisfy the Bragg condition for step (d) above.

* * * * *